Figure 1:
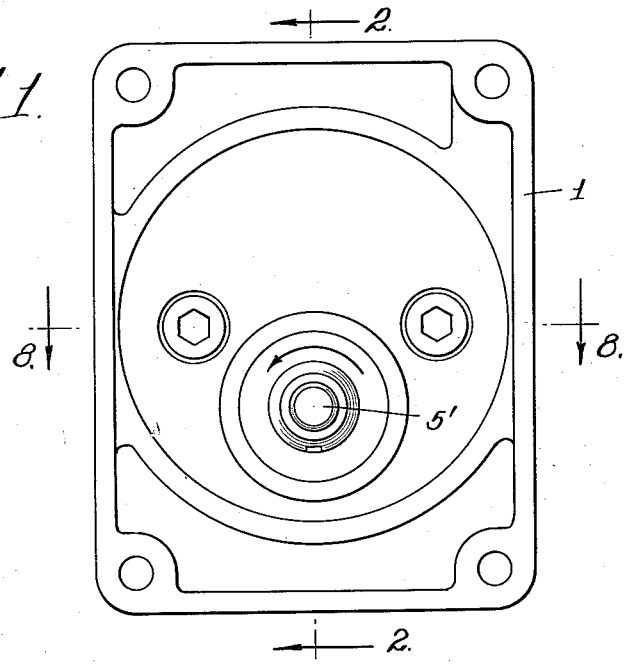

July 10, 1962 — H. MOLLY — 3,043,230

HIGH PRESSURE GEAR PUMP

Filed April 1, 1957

3 Sheets-Sheet 1

INVENTOR.
Hans Molly
BY
Jones, Darby + Robertson
Att'ys.

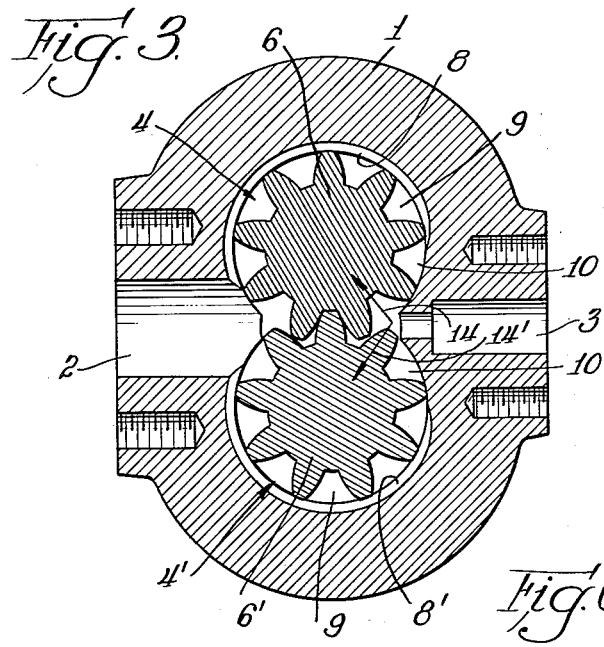

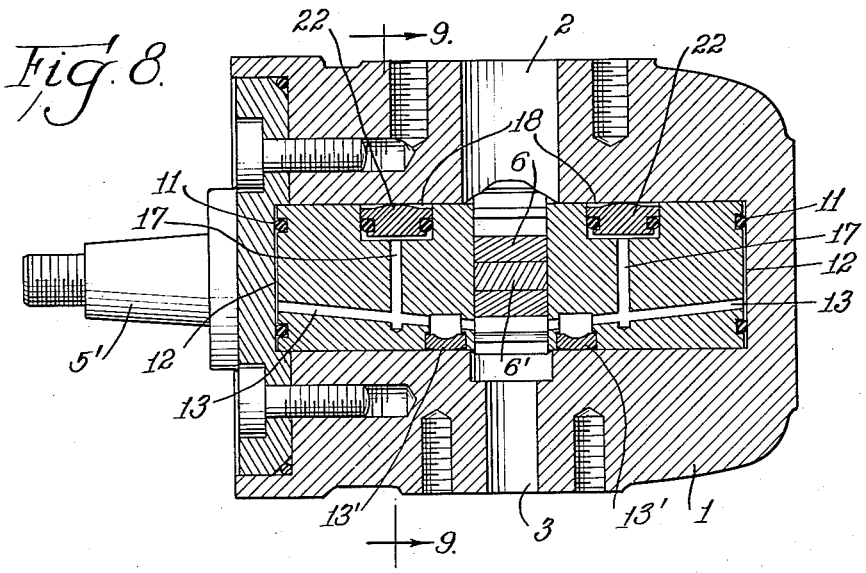
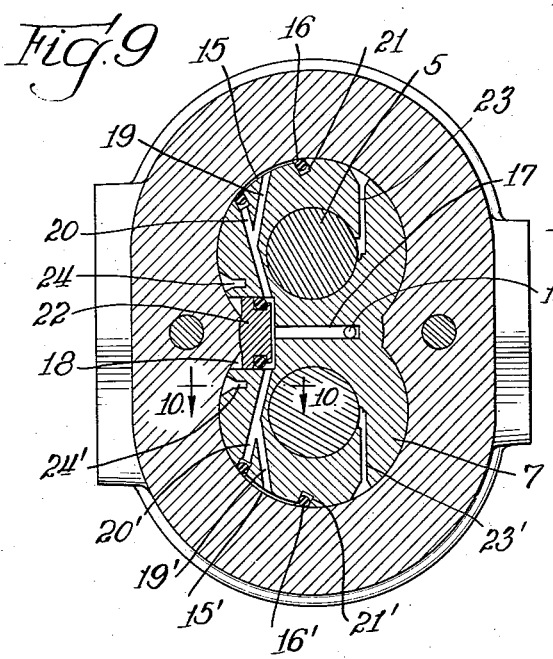
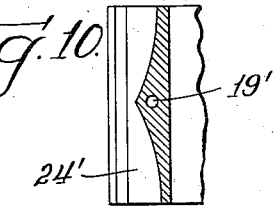
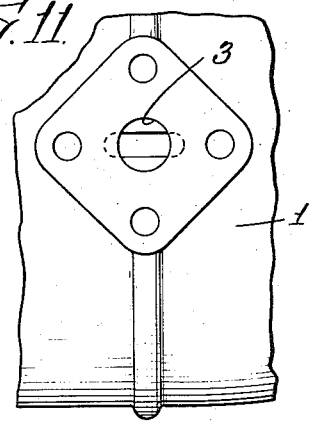

3,043,230
Patented July 10, 1962

---

3,043,230
HIGH PRESSURE GEAR PUMP
Hans Molly, Dr. Engen-Essig-Str. 48, Malsch, near Karlsruhe, Germany, assignor of one-half to Otto Eckerle, Malsch, near Karlsruhe, Germany
Filed Apr. 1, 1957, Ser. No. 650,015
Claims priority, application Germany June 30, 1956
26 Claims. (Cl. 103—126)

This invention relates to a gear pump and is particularly concerned with such a pump which is suitable for high pressure. As is well known, the principle of the gear pump contemplates that a medium to be pumped is continuously conveyed by the tooth gaps of contrarotating and mating gear wheels from the suction chamber to the exhaust chamber. If it is intended to use such a gear pump to produce high pressures, a matter of prime importance in this case is that a good sealing of the exhaust chamber is ensured. Conventional constructions of such gear pumps make use of special bearing bodies to support the gear wheels, these bearing bodies being inserted into the pump housing with a small axial play and being so generously sized that they can be used for axial sealing of the exhaust chamber.

At least one of the bearing bodies is for this purpose provided with a pressure area in which a sealing effort opposed to the pressure exerted by the pump and as a function of the discharge pressure is produced. Due to this sealing effort, the bearing bodies are forced axially against the lateral surfaces of the gear wheels, this action being stronger as greater pressure is produced by the pump, as the pressure produced by the pump tends to force the bearing bodies away from the gear wheels. A movement of the gear wheels between the sealing bearing bodies that is free from play in axial direction is obtained in this manner.

The present invention is based upon the conception that an axial sealing action is insufficient to effect adequate sealing of the exhaust chamber, because this sealing action is not capable of compensating for all of the forces produced in the exhaust chamber, and furthermore is incapable of exerting any influence on the always present radial bearing clearance.

The invention has therefore for its object to conceive and to construct a gear pump in such a manner that all of the forces arising in the exhaust chamber of the pump are compensated by oppositely directed sealing forces produced as a function of the pump pressure. The pressure areas provided for the production of the sealing forces may be so dimensioned that the sealing forces in each case preponderate slightly over the other forces arising in the pump chamber.

It is a principal feature of the invention that the pressure areas are so arranged and situated that the sealing forces produced therein at least partially act transversely to the axes of rotation of the gear wheels in a direction towards the exhaust chamber. This has the effect that the sealing forces are also capable of minimizing the radial bearing clearance and avoiding a unilateral thrust load on the gear wheel bearings.

The invention further contemplates that the suction chamber of the pump will be in open connection with a plurality of the revolving tooth gaps, and that the exhaust chamber is limited to a small section of the circumference of the gear wheel, in which section at least one crest on each side sealingly contacts a cylindrical exhaust chamber wall. Exactly defined conditions for pressure distribution within the pump chamber are obtained by such a limitation of the exhaust chamber, so that an appropriate location and dimensioning of the pressure areas is possible.

Figure 2:
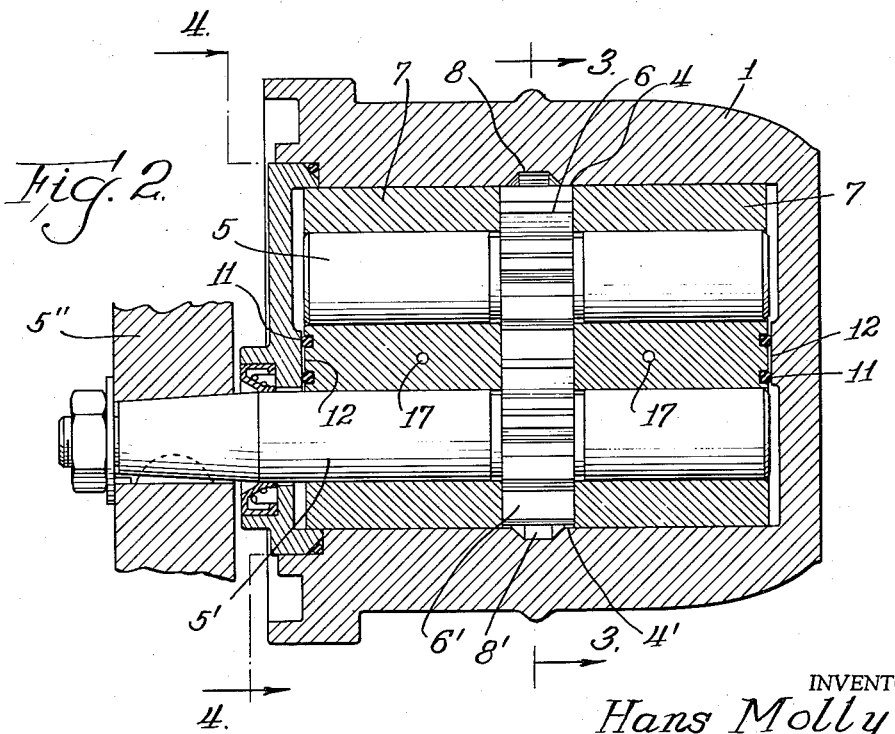

These and further advantageous objects of the invention will appear from the following detailed description of the two preferred embodiments of the invention herein shown and described with reference to FIGS. 1 to 17 of the accompanying drawings, wherein:

FIG. 1 is an end elevational view of the gear pump;
FIG. 2 is a longitudinal cross-section view taken at line 2—2 of FIG. 1;
FIG. 3 is a cross-sectional view taken at line 3—3 of FIG. 2;
FIG. 4 is an end view partly in cross-section taken at line 4—4 of FIG. 2;
FIG. 5 is a side elevational view of one of the bearing slots as viewed from the height of FIG. 4;
FIG. 6 is a fragmentary cross-sectional detail view taken on line 6—6 of FIG. 5;
FIG. 7 is a side elevational view of one of the bearing blocks as viewed from the left side of FIG. 4;
FIG. 8 is a cross-sectional view taken at line 8—8 of FIG. 1;
FIG. 9 is a cross-sectional view taken at line 9—9 of FIG. 8;
FIG. 10 is a detail view taken at the line 10—10 of FIG. 9;
FIG. 11 is a detail view of the structure at the outlet port.

In one embodiment selected for illustration, a pump housing 1 is provided on its one side with a suction channel 2 and with a delivery channel 3 arranged coaxially and opposite to the channel 2. Both channels 2, 3 open into a hollow space of the housing 1 which is formed by two cylindrical recesses 4 and 4' overlapping in the center. Two gear wheels 6 and 6' mounted for rotation on shafts 5 and 5' are inserted into said recess 4, 4', the diameter of the gear wheels 6,6' corresponding to that of the recesses 4, 4'. The shafts 5,5' are supported in bearing bodies 7 that fit exactly into the recesses 4, 4' of the pump housing 1 at opposite sides of the gear wheels. The shaft 5' of the lower gear wheel 6' protrudes from the bearing body 7 for coupling with a drive element 5". It will be observed that the teeth of gear wheels 6 are shrouded by closely fitting surfaces of housing 1 and bearing bodies 7. Hence these may jointly be considered shrouding means.

Equalizing grooves 8 and 8' extending over about half the circumference of the gear wheels 6, 6' are provided in the cylindrical surface of the recesses 4, 4' encircling the gear wheels 6, 6'. The equalizing grooves 8, 8' serve to establish communication between the suction channel 2 and the plurality of tooth gaps 9 in which gaps, consequently, no pressure differentials are produced. If, now, the gear wheel 6' is driven in the direction of rotation indicated by the arrow shown in FIG. 1, the gear wheels 6 and 6' will rotate in opposite directions. Due to such a rotation of the gear wheels 6, 6' the medium to be pumped, e.g., oil, entering through the suction channel 2 is now conveyed by the tooth gaps 9 in the direction towards the delivery channel 3. No excess pressure can arise in the tooth gaps 9 as long as the crests of the gear wheels 6, 6' move within the reach of the equalizing grooves 8, 8'. As soon as one of the crests leaves the reach of the equalizing groove 8 or 8' respectively, the tooth gap situated in front of this crest is no longer in communication with the suction channel 2, but is sealed off by the crest and the wall of the pump housing 1 that has no grooves in this zone. In the space of the pump housing 1 in which the tooth gaps of the gear wheels 6, 6' are not in communication with the low pressure or suction channel 2, which space is generally designated as the high pressure or exhaust chamber 10, the delivery pressure is produced which also exists in the delivery channel 3 connected to the exhaust chamber 10.

Conventional constructions of such gear pumps do not have such equalizing grooves 8, 8', so that pressures increasing from one tooth gap to the other and acting upon a relative large surface of the bearing bodies 7 would exist in the tooth gaps 9. Due to the existence of the equalizing grooves 8, 8', the exhaust chamber 10 is limited to a relative small zone of the gear wheel circumference so that the high pressure therein acts upon a relative small surface of the bearing bodies 7. The axial component of the force due to pressure in exhaust chamber 10 tends to force the lateral surfaces of the gear wheels 6, 6' and the bearing bodies 7 apart, permitting leakage of the fluid from the exhaust chamber. To prevent this, pressure pocket 12 limited by a ring 11 of rubber or other resilient material is provided at the outside of the bearing body 7, a channel 13 leading to the exhaust chamber 10 opening into the pressure pocket 12. A sealing effort opposed to the outward axial component of force caused by pressure in exhaust chamber 10 and slightly greater than this component is now produced as a function of the exhaust pressure in the pressure pocket 12 arranged between the cover of the pump housing and the bearing body 7. This sealing effort from the pressure pocket 12 now forces the bearing bodies 7 against the lateral surfaces of the gear wheels 6, 6' thus eliminating the axial play in the system and preventing leakage with consequent loss of pressure in delivery channel 3.

A pressure pocket 12 of small area is sufficient to obtain this axial sealing effort, as the pressure in the exhaust chamber 10 only acts upon a relatively small surface of the bearing bodies 7.

There is not only an axial force that is produced by the pressure in the exhaust chamber 10, but there are also laterally directed forces, as indicated by the arrows 14, 14', produced by this pressure. Any movement of the gear wheels caused by such lateral forces result in increased leakage past the sealing crests thereof with consequent loss of pressure in the exhaust chamber. In order to counteract and prevent such undesirable result, pressure pockets 15, 15' (FIG. 9) are also provided at the cylindrical surfaces of the bearing bodies 7, each of these pressure pockets being limited by a resilient ring 16, 16'. A channel 17 is provided in the bearing body 7 and opens at its one end in the exhaust space 10 and with its other end in a pressure chamber 18 of the bearing body 7. Channels 19, 19' lead from the pressure chamber 18 to the pressure pockets 15, 15'. Branches 20 and 20' of the channels 19, 19' open in annular grooves 21, 21' below the packing or sealing rings 16, 16' to force the rings into contact with the cylindrical wall of the recesses 4, 4' so as to obtain a good sealing of the pressure pockets 15, 15' which are subject to the exhaust chamber pressure through the channels 19, 19', respectively. Accordingly, forces are produced in the pressure pockets 15, 15' which are opposed to the radial components of force 14, 14' and which, with a desirable surplus of power, force the crests of the gear wheels 6, 6' toward or against the wall of the exhaust chamber 10 to ensure good sealing pressure. However, the gear wheels cannot wear their way without limit into the wall of exhaust chamber 10, because this is obviously prevented by the solid thickness of the portions of bearing bodies 7 lying on the sides of shafts 5, 5' toward the exhaust chambers and which, as stated elsewhere, fit their recesses 4, 4' exactly.

This effect of the pressure pockets 15, 15' is augmented by a piston-like plug 22 closing the pressure chamber 18 of the bearing body 7 and resting against the pump housing 1. This plug is slidable within chamber 18 to bear at all times against the pump housing.

In order to avoid excessive bearing clearance between the shafts 5, 5' and the bearing body 7 which is due to the radial forces exerted in the exhaust chamber, the bearing body 7 is provided with slots 23, 23', 24, 24' so as to give the bearing body some elasticity which has the effect that, under the influence of the radial sealing efforts, the bearing body will contact the shafts 5, 5' free from play.

The slots 23, 23', 24, 24' are in communication with the equalizing grooves 8, 8', which may be through the tooth spaces, so that the fluid not yet under pressure and conveyed by the gear wheels 6, 6' can enter the slots 23, 23' simultaneously lubricating and cooling the bearing surfaces of the shaft journals 5, 5' in the bearing body 7.

It also must be taken into consideration that in the zone of the exhaust chamber 10, the fluid under high pressure penetrates laterally the gap formed between the bearing bodies 7 and the wall of the pump housing 1 and there produces forces which tend to force away the bearing bodies 7 from the wall of the housing. In order to keep the area of the bearing body against which this pressure is applied as small as possible, limiting grooves 25, 25' (FIGS. 5 and 6) are provided in the bearing body 7, a channel 26 establishing the communication of these limiting grooves with the suction zone, so that there is only a narrow external zone 27 of the bearing body 7 where the fluid penetrating the gap between the bearing body and housing can become effective in a force producing manner. The forces arising there are equalized by the reacting force produced at the piston plug 22. The plug 13' serves to seal off the high pressure exhaust chamber at the level of the discharge channel.

Due to the localization of the pump pressure to an exhaust chamber 10 which is reduced in size by the equalizing grooves 8, 8' and by the limitation of the pressure areas 27 adjacent the exhaust chamber 10 by means of the limiting grooves 25, 25', it is possible in the gear pump constructed according to the invention, with relatively small counter-pressure pockets acting partly in axial (pocket 12) and partly in radial direction (pockets 15, 15' and piston plug 22), to produce sufficient sealing forces and to over-compensate all forces which are opposed to the sealing of the exhaust chamber 10.

Invention is claimed as follows:

1. A high pressure geared device comprising a housing having a recess, with inlet and discharge connections and two gear wheels intermeshing and arranged in the recess in said housing, each gear wheel having a shaft extending axially in opposite directions therefrom, bearing bushings on opposite sides of the gear wheels and at least one supported for axial movement in said recess for engaging the lateral faces of the gear wheels as a limit of axial movement, said gear wheels, bushings and housing forming a high pressure chamber and a low pressure chamber each in communication with one of said connections and forming a seal on all sides of the high pressure chamber; said device having passages communicating with the low pressure chamber and extending to the vicinity of the high pressure chamber to points generally surrounding the high pressure chamber, but sufficiently spaced therefrom to leave an effective seal, including passage portions communicating with the tooth spaces outside of but close to the high pressure chamber and passage portions communicating with the periphery of the bearing bushing axially spaced from but close to the high pressure chamber, for receiving any fluid escaping the seal and confining to the vicinity of the high pressure chamber the high pressure forces tending to produce unsealing movements of the parts; said device having passages leading from the high pressure chamber to a location on a bushing which is axially movable, the location being on the face of said bushing axially remote from the high pressure chamber, and to locations generally opposite the high pressure chamber diametrically; seal means at each of said locations for confining the area of effectiveness of the high pressure fluid with effective areas sufficient to more than balance the unsealing forces so as to ensure sealing engagement of each bushing against the lateral faces of the gear wheels, and against the housing adjacent the high pressure chamber and to press the gear wheels toward and in sealing relationship with the housing adjacent the high pressure chamber.

2. A high pressure geared device according to claim 1 in which the bushings on both sides of the gear wheels are axially movable and are fluid-urged axially toward the gear wheels.

3. A high pressure geared device according to claim 1, said bushings each being split on one side by a slot extending through the body between a sealing portion adjacent the high pressure chamber and a thrust portion opposite thereto; the body being so constructed that the walls forming the slot are movable toward one another; one of said locations to which the passages lead being located to be effective between the sealing portion and the housing generally opposite the high pressure chamber to press the sealing portion toward the high pressure chamber with a force sufficient at least with aid from forces developed at other said locations, to offset the opposite unsealing forces of high pressure liquid on the bushings.

4. A high pressure geared device according to claim 3 in which one of said locations is between the thrust portion of each bushing and the casing, to cause the fluid pressure effective at that location to flex the bushing, if the shaft is loose therein, to press the shaft and gears generally radially toward the high pressure chamber.

5. A high pressure geared device according to claim 1 in which the seal means at at least one of said locations is a resilient loop fluid-pressed into sealing engagement with the housing and the bushing.

6. A high pressure geared device according to claim 1 in which a piston and cylinder are provided at at least one of said locations to confine the fluid and exert thrust in the direction to cause sealing adjacent the high pressure chamber.

7. A meshed gear hydraulic device including a pair of gears meshing in a common meshing zone, housing and shrouding means for the gears including peripheral sealing surfaces along which the tips of the gears move in sealing relationship on one side of the meshing zone and close thereto, side sealing means sealing the spaces between the teeth of the gears along the sides of the gears in the meshing zone and beyond the meshing zone to the sealing engagement of the gears with said peripheral sealing surface to seal off a high pressure chamber, said housing means also forming a low pressure chamber on the opposite side of the meshing zone from the high pressure chamber and having inlet and outlet passages one of which communicates with the high pressure chamber and the other with the low pressure chamber, relief passages communicating with the lower pressure chamber and communicating with the spaces between the teeth of the gears at positions beyond said peripheral sealing surfaces from the high pressure chamber but extending to a position close to but always sealed from the high pressure chamber to relieve the gears from peripheral high pressure conditions except for a small proportion of their peripheries in or adjacent the high pressure chamber; said gears having shafts extending from said gears on opposite sides thereof; said device including bearings in said housing and through which the shafts extend in bearing relationship and said device including hydraulic means for applying a bias to the shafts generally on the opposite sides of the shafts from the high pressure chamber for biasing the gears towards said peripheral sealing surfaces, said hydraulic means being in communication with the high pressure chamber and being confined to a predetermined effective total hydraulic area such that the sealing forces thus produced are predeterminedly preponderant over the opposing hydraulic forces which tend to unseal the gears from said peripheral sealing surfaces.

8. A meshed gear hydraulic device including a pair of gears meshing in a common meshing zone, housing and shrouding means for the gears including peripheral sealing surfaces along which the tips of the gears move in sealing relationship on one side of the meshing zone and close thereto, side sealing means sealing the spaces between the teeth of the gears along the sides of the gears in the meshing zone and beyond the meshing zone to the sealing engagement of the gears with said peripheral sealing surface to seal off a high pressure chamber, said housing means also forming a low pressure chamber on the opposite side of the meshing zone from the high pressure chamber and having inlet and outlet passages one of which communicates with the high pressure chamber and the other with the low pressure chamber, relief passages communicating with the low pressure chamber and communicating with the spaces between the teeth of the gears at positions beyond said peripheral sealing surfaces from the high pressure chamber but extending to a position close to but always sealed from the high pressure chamber to relieve the gears from peripheral high pressure conditions except for a small proportion of their peripheries in or adjacent the high pressure chamber; said gears having shafts extending from said gears on opposite sides thereof; said device including bearings in said housing and through which the shafts extend in bearing relationship and said device including hydraulic means for applying a bias to the shafts generally on the opposite sides of the shafts from the high pressure chamber for biasing the gears towards said peripheral sealing surfaces, said hydraulic means being in communication with the high pressure chamber and including resilient seal means for confining the hydraulic biasing fluid to a predetermined effective total hydraulic area such that the sealing forces thus produced are predeterminedly preponderant over the opposing hydraulic forces which tend to unseal the gears from said peripheral sealing surfaces.

9. A meshed gear hydraulic device including a pair of gears meshing in a common meshing zone, housing and shrouding means for the gears including peripheral sealing surfaces along which the tips of the gears move in sealing relationship on one side of the meshing zone and close thereto, side sealing means sealing the spaces between the teeth of the gears along the sides of the gears in the meshing zone and beyond the meshing zone to the sealing engagement of the gears with said peripheral sealing surface to seal off a high pressure chamber, said housing means also forming a low pressure chamber on the opposite side of the meshing zone from the high pressure chamber and having inlet and outlet passages one of which communicates with the high pressure chamber and the other with the low pressure chamber, relief passages communicating with the low pressure chamber and communicating with the spaces between the teeth of the gears at positions beyond said peripheral sealing surfaces from the high pressure chamber but extending to a position close to but always sealed from the high pressure chamber to relieve the gears from peripheral high pressure conditions except for a small proportion of their peripheries in or adjacent the high pressure chamber; said gears having shafts extending from said gears on opposite sides thereof; said device including bearings in said housing and through which the shafts extend in bearing relationship and having portions beyond the shafts from the high pressure chamber relatively movable toward the high pressure chamber, and said device including hydraulic means for applying a bias to the relatively movable portions of the bearings for biasing the gears towards said peripheral sealing surfaces, said hydraulic means being in communication with the high pressure chamber and being confined to a predetermined effective total hydraulic area such that the sealing forces thus produced are predeterminedly preponderant over the opposing hydraulic forces which tend to unseal the gears from said peripheral sealing surfaces.

10. A meshed gear hydraulic device including a pair of gears meshing in a common meshing zone, housing and shrouding means for the gears including peripheral sealing surfaces along which the tips of the gears move in sealing relationship on one side of the meshing zone and close thereto, side sealing means sealing the spaces between the teeth of the gears along the sides of the gears in the meshing zone and beyond the meshing zone to the sealing engagement of the gears with said peripheral sealing surface to seal off a high pressure chamber, said housing means also forming a low pressure chamber on the opposite side of the meshing zone from the high pressure chamber and having inlet and outlet passages one of which communicates with the high pressure chamber and the other with the low pressure chamber, relief passages communicating with the low pressure chamber and communicating with the spaces between the teeth of the gears at positions beyond said peripheral sealing surfaces from the high pressure chamber but extending to a position close to but always sealed from the high pressure chamber to relieve the gears from peripheral high pressure conditions except for a small proportion of their peripheries in or adjacent the high pressure chamber; said gears having shafts extending from said gears on opposite sides thereof; said device including bearing bodies in said housing and through which the shafts extend in bearing relationship and split by slots extending outwardly through the bearing bodies from the side of each shaft between the high pressure chamber and the opposite side of the shafts, the body being so constructed that the walls forming the slot are movable toward one another and said device including hydraulic means for applying a bias to the portions of the split bearing bodies located generally on the opposite sides of the shafts from the high pressure chamber for biasing the gears towards said peripheral sealing surfaces, said hydraulic means being in communication with the high pressure chamber and being confined to a predetermined effective total hydraulic area such that the sealing forces thus produced are predeterminedly preponderant over the opposing hydraulic forces which tend to unseal the gears from said peripheral sealing surfaces.

11. A meshed gear hydraulic device according to claim 10, in which the bearing bodies are of thin cross section radially at least a position generally opposite their slots to provide a flexibility to yield to the hydraulic means.

12. A meshed gear hydraulic device according to claim 10, in which the portion of the bearing bodies on the sides of the shaft facing the high pressure chamber are of nonyielding character exactly fitting the housing.

13. A meshed gear hydraulic device according to claim 10, in which the gear device is provided with passages communicating with the lower pressure chamber and with the slots in the bearing bodies to expose the full length of the shafts in the bearing bodies to the hydraulic fluid.

14. A meshed gear hydraulic device according to claim 7, in which relief passages are provided communicating with the lower pressure chamber and opening to the interfaces between the bearings and the housing at locations spaced from, and extending along, the high pressure chamber to limit the pressure field resulting from escape of fluid from the high pressure chamber to the space between the bearings and the housing.

15. A meshed gear hydraulic device according to claim 7, in which relief passages are provided communicating with the low pressure chamber and opening to the interfaces between the bearings and the housing at locations spaced from the high pressure chamber to limit the pressure field resulting from escape of fluid from the high pressure chamber to the space between the bearings and the housing.

16. A meshed gear hydraulic device according to claim 15 and in which the high pressure chamber is sealed against leakage along the interfaces between the bearings and the housing by relatively movable seal members having faces other than their sealing faces exposed to pressure from the high pressure chamber.

17. A meshed gear hydraulic device according to claim 8 in which the resilient seal means has faces other than the sealing faces exposed to pressure from the high pressure chamber to apply pressure on the sealing faces.

18. A meshed gear hydraulic device including a pair of gears meshing in a common meshing zone, housing and shrouding means for the gears including peripheral sealing surfaces along which the tips of the gears move in sealing relationship on one side of the meshing zone and close thereto, side sealing means sealing the spaces between the teeth of the gears along the sides of the gears in the meshing zone and beyond the meshing zone to the sealing engagement of the gears with said peripheral sealing surface to form a high pressure chamber, said housing means also forming a low pressure chamber on the opposite side of the meshing zone from the high pressure chamber and having inlet and outlet passages one of which communicates with the high pressure chamber and the other with the low pressure chamber; said gears having shafts extending from said gears on opposite sides thereof; said device including bearings in said housing on opposite sides of the gears and through which the shafts extend in bearing relationship and said device including hydraulic means symmetrically disposed with respect to the mid-radial plane of the gears for applying a bias to the shafts generally on the opposite sides of the shafts from the high pressure chamber for biasing the gears towards said peripheral sealing surfaces with resultant radial force solely in said plane, said hydraulic means being in communication with the high pressure chamber and being of sufficient area such that the sealing forces thus produced are preponderant over the opposing hydraulic forces which tend to unseal the gears from said peripheral sealing surfaces.

19. A meshed gear hydraulic device comprising a housing with an inlet leading to and an outlet leading from that housing, two intermeshing gear wheels arranged in a recess in said housing, each gear wheel having a shaft extending axially in opposite directions therefrom, bearing bushings on opposite sides of the gear wheels and at least on one side of the gears supported for axial movement in said recess for engaging the lateral faces of the gear wheels, said housing, gear wheels and bushings sealingly enclosing a high pressure chamber and a low pressure chamber, one of the chambers being connected with said inlet, the other chamber with said outlet, said axially movable bushing being subject to radial and axial unsealing pressure forces concentrated in the region of the high pressure chamber, said device including means forming an axially acting hydraulic pressure field, connected with the high pressure chamber, at the end face of the bushings, the forces of which overcome but produce a moment with the pressure force acting axially on the bushings, and means forming additional hydraulic pressure fields acting radially at points different from the axially acting fields, and overcoming but producing a moment with the radial unsealing pressure forces, said fields being so disposed that the moment of the radially acting forces opposes the moment of the axially acting forces.

20. A meshed gear hydraulic device according to claim 19 in which the moment of the radially acting forces is produced by pressure, generally in a first direction, of the seepage fluid in the interface between a bearing bushing and the housing limited in area by a relief groove communicating with the low pressure chamber and of the sealing force of a sealing piston adjacent said area and by second forces acting radially in a different radial plane and in substantially the opposite direction.

21. A meshed gear hydraulic device according to claim 20 in which the second forces are produced by a piston arranged in a recess of the bearing bushing and being pressed against the housing by the pressure of the high pressure chamber.

22. A meshed gear hydraulic device comprising a housing with an inlet leading to and an outlet leading from that housing, two intermeshing gears arranged in a recess in said housing, each gear having a shaft extending axially in opposite directions therefrom, bearing bushings on opposite sides of the gears and at least on one side of the gears supported for axial movement in said recess for engaging the lateral faces of the gears, said housing, gears and bushings sealingly enclosing a high pressure chamber and a low pressure chamber, one of the chambers being connected with said inlet, the other chamber with said outlet, with grooves opening along the peripheral surface of each bearing bushing parallel to the side faces of the gears at the side near the high pressure chamber and spaced from this chamber; and said device having passages connecting said grooves with said low pressure chamber, thereby limiting the peripheral area of the surface of the bearing bushing which is subjected to the high pressure of liquid leaking between the bearing body and the housing.

23. A meshed gear hydraulic device according to claim 22 in which the bearing bushings are formed by bearing bodies, each of which has two bearing bores which receive the gear shafts, two essentially cylindrical parts surrounding these bores and a bridge part connecting these cylindrical parts, the thickness of which is less than the diameter of the cylindrical parts; and in which device said grooves open to the cylindrical parts; and including a sealing body sealing the peripheral surface of the bridge part between these grooves, the inner side of the sealing body being connected through a passage to the high pressure chamber.

24. A hydraulic pressure device having a high pressure chamber and including two parts between which a high pressure field is desired, and having communication from said chamber to said field, one of the parts having an endless groove in its surface surrounding the field, a resilient endless means in the endless groove and sealing against both sides thereof; and the grooved part having a passage connecting the groove under said resilient endless means with the high pressure chamber independently of flow through the field whereby high pressure of fluid other than the fluid in the field effectuates sealing engagement of the resilient endless means with the opposed surface of the other part of the device; said passage and the communication from the high pressure chamber to the field and through the field to the resilient endless means comprising two branches, the one leading directly to the groove under the resilient means and being shorter than the other, so that the resilient endless means will be hydraulically pressed to sealing engagement before an unsealing pressure is effective, whereby it is independent of mechanical pressure to effectuate the seal.

25. A hydraulic pressure device having a high pressure chamber and including two parts between which a high pressure field is desired, and having communication from said chamber to said field, one of the parts having an endless groove in its surface surrounding the field, a resilient endless means in the endless groove and sealing against both sides thereof; and the grooved part having a passage connecting the groove under said resilient endless means with the high pressure chamber independently of flow through the field whereby high pressure of fluid other than the fluid in the field effectuates sealing engagement of the resilient endless means with the opposed surface of the other part of the device; the communication between the pressure field and the high pressure chamber being through a conduit not in the path of flow between the high pressure chamber and said groove and having over an appreciable length a narrow cross section much smaller in area than the area of the pressure field, so that the resilient endless means will be hydraulically pressed to sealing engagement before an unsealing pressure is effective, whereby it is independent of mechanical pressure to effectuate the seal.

26. A meshed gear hydraulic device including a housing, a pair of gears meshed within the housing, shafts carrying the gears, a bearing bushing surrounding the shafts and axially slidable along the shafts and within the housing to seal the side faces of the gears and to cooperate with the gears and housing in forming a high pressure chamber, one of said bushings and said housing having an endless groove in its surface surrounding a high pressure field between said bushing and said housing, a resilient endless means in the endless groove and sealing against both sides thereof; and the grooved part having a passage connecting the groove under said resilient endless means with the high pressure chamber independently of flow through the field whereby high pressure of fluid other than the fluid in the field effectuates sealing engagement of the resilient endless means with the opposed surface of the other part of the device; said passage and the communication from the high pressure chamber to the field and through the field to the resilient endless means comprising two branches, the one leading directly to the groove under the resilient means and being shorter than the other, so that the resilient endless means will be hydraulically pressed to sealing engagement before an unsealing pressure is effective, whereby it is independent of mechanical pressure to effectuate the seal.

References Cited in the file of this patent

UNITED STATES PATENTS

| | | |
|---|---|---|
| 164,147 | Conver | June 8, 1875 |
| 1,673,259 | Meston et al. | June 12, 1928 |
| 1,880,108 | Ross | Sept. 27, 1932 |
| 2,319,374 | Ungar | May 18, 1943 |
| 2,639,694 | Johnson | May 26, 1953 |
| 2,641,192 | Linberg | June 9, 1953 |
| 2,660,958 | Lauck | Dec. 1, 1953 |
| 2,682,836 | Orr | July 6, 1954 |
| 2,691,945 | Wichorek | Oct. 19, 1954 |
| 2,728,301 | Lindberg | Dec. 27, 1955 |
| 2,742,862 | Banker | Apr. 24, 1956 |
| 2,746,394 | Dolz et al. | May 22, 1956 |
| 2,769,396 | Norlin | Nov. 6, 1956 |
| 2,796,031 | Miller | June 18, 1957 |
| 2,808,007 | Gaubatz | Oct. 1, 1957 |
| 2,809,592 | Miller et al. | Oct. 15, 1957 |
| 2,816,510 | Jarvis | Dec. 17, 1957 |
| 2,822,759 | Norlin | Feb. 11, 1958 |
| 2,823,615 | Haberland | Feb. 18, 1958 |
| 2,824,522 | Compton | Feb. 25, 1958 |
| 2,824,524 | Banker | Feb. 25, 1958 |
| 2,842,066 | Hilton | July 8, 1958 |
| 2,853,952 | Aspelin | Sept. 30, 1958 |
| 2,855,854 | Aspelin | Oct. 14, 1958 |
| 2,855,855 | Murray et al. | Oct. 14, 1958 |
| 2,880,678 | Hoffer | Apr. 7, 1959 |
| 2,891,483 | Murray et al. | June 23, 1959 |
| 2,923,249 | Lorenz | Feb. 2, 1960 |
| 2,932,254 | Booth et al. | Apr. 12, 1960 |
| 2,955,536 | Gaubatz | Oct. 11, 1960 |
| 2,981,200 | Stephens | Apr. 25, 1961 |

FOREIGN PATENTS

| | | |
|---|---|---|
| 158,367 | Sweden | Mar. 26, 1957 |
| 546,859 | Belgium | Apr. 30, 1956 |
| 1,006,722 | Germany | Apr. 18, 1957 |

(German application—KL. 59e 3/01)